United States Patent [19]
Washam

[11] Patent Number: 5,410,986
[45] Date of Patent: May 2, 1995

[54] BIRD FEEDER FORMED OF A PLURALITY OF INTERCONNECTED TUBULAR COLUMNS

[76] Inventor: Larry W. Washam, P.O. Box 72, Lillie, La. 71256

[21] Appl. No.: 269,126

[22] Filed: Jun. 30, 1994

[51] Int. Cl.$^6$ .............................................. A01K 39/01
[52] U.S. Cl. .................................. 119/52.2; 119/57.8
[58] Field of Search ..................... 119/52.2, 52.3, 57.8, 119/57.9, 52.1; 446/89, 117, 124, 128; 248/146, 150, 156

[56] References Cited

U.S. PATENT DOCUMENTS

| | | | |
|---|---|---|---|
| 2,970,701 | 2/1961 | Fetter | 248/156 |
| 3,682,323 | 8/1972 | Bergquist et al. | 446/124 |
| 4,164,091 | 8/1979 | Lin | 446/124 |
| 4,441,457 | 4/1984 | Sanford | 119/57.9 |
| 4,896,628 | 1/1990 | Kadunce | 119/52.2 |
| 5,022,349 | 6/1991 | Bryant et al. | 119/57.8 |
| 5,044,319 | 9/1991 | Blasbalg | 119/57.9 |
| 5,086,730 | 2/1992 | Figley | 119/52.3 |
| 5,235,935 | 8/1993 | Edwards | 119/57.8 |
| 5,345,892 | 9/1994 | Khan | 119/57.9 |

FOREIGN PATENT DOCUMENTS 3314536 9/1985 Germany ............................. 119/52.1

Primary Examiner—Todd E. Manahan
Attorney, Agent, or Firm—David L. Baker; Rhodes & Ascolillo

[57] ABSTRACT

An apparatus for feeding birds has a tubular support column. There is a plurality of tubular male platform linking columns. A tubular support cross-over column connects the tubular support column to one of the tubular male platform linking columns. There is a plurality of tubular feed distribution chamber columns and there is a plurality of feeding platforms having a link port. One of the tubular male linking columns, extending through the link port of one of the feeding platforms, removably connects the tubular support cross-over column to one of the tubular feed distribution chamber columns. Another one of the tubular male/linking columns, extending through the link port of another one of the feeding platforms, removably connects the one tubular feed distribution chamber column to another tubular feed distribution chamber column. A tubular feed direction column connects to each tubular feed distribution chamber column. A feed abutment plug is placed in the one feed distribution chamber column. There is a filler cap assembly. A tubular filler cap assembly cross-over column connects one of the tubular feed distribution chamber columns to the filler cap assembly. A canopy is removably connected to one of the tubular feed distribution chamber columns.

3 Claims, 5 Drawing Sheets

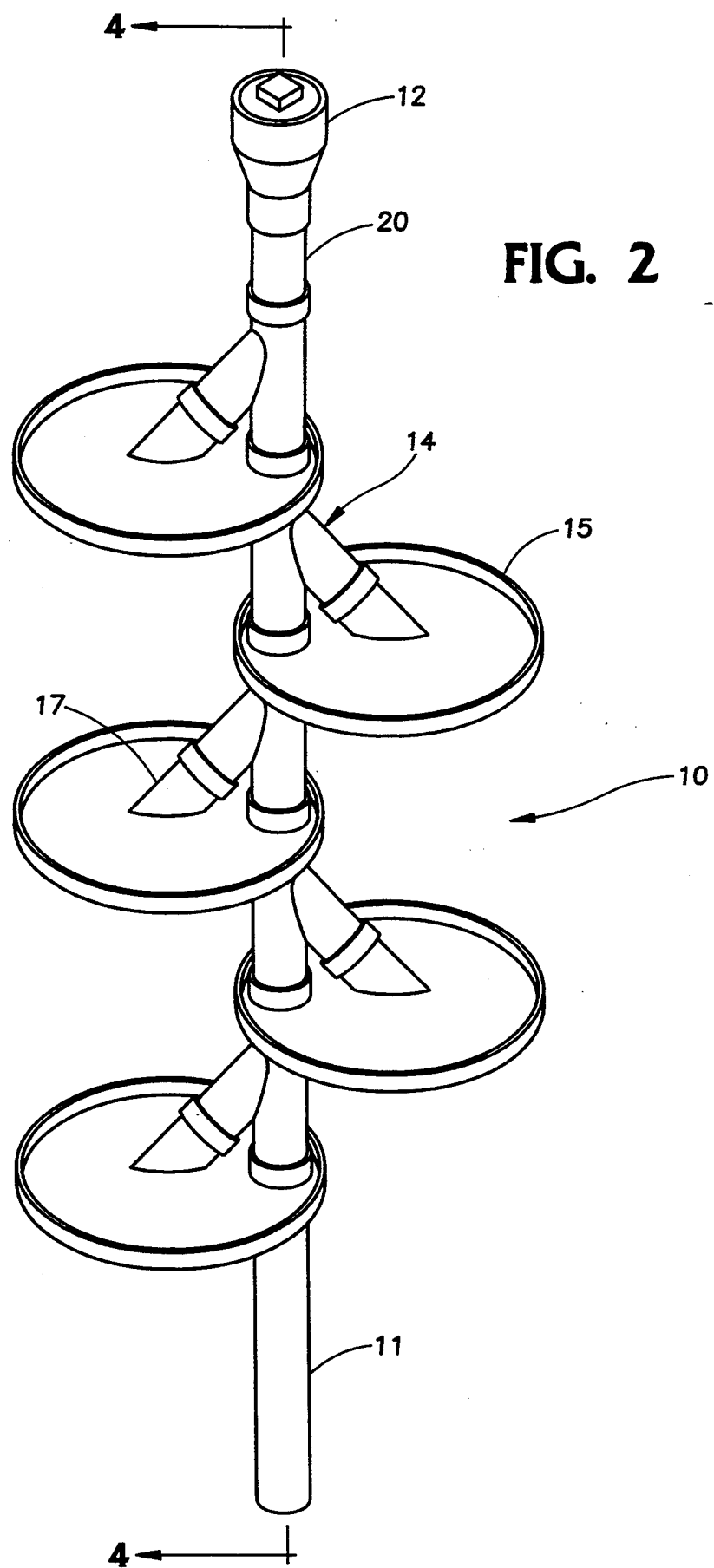

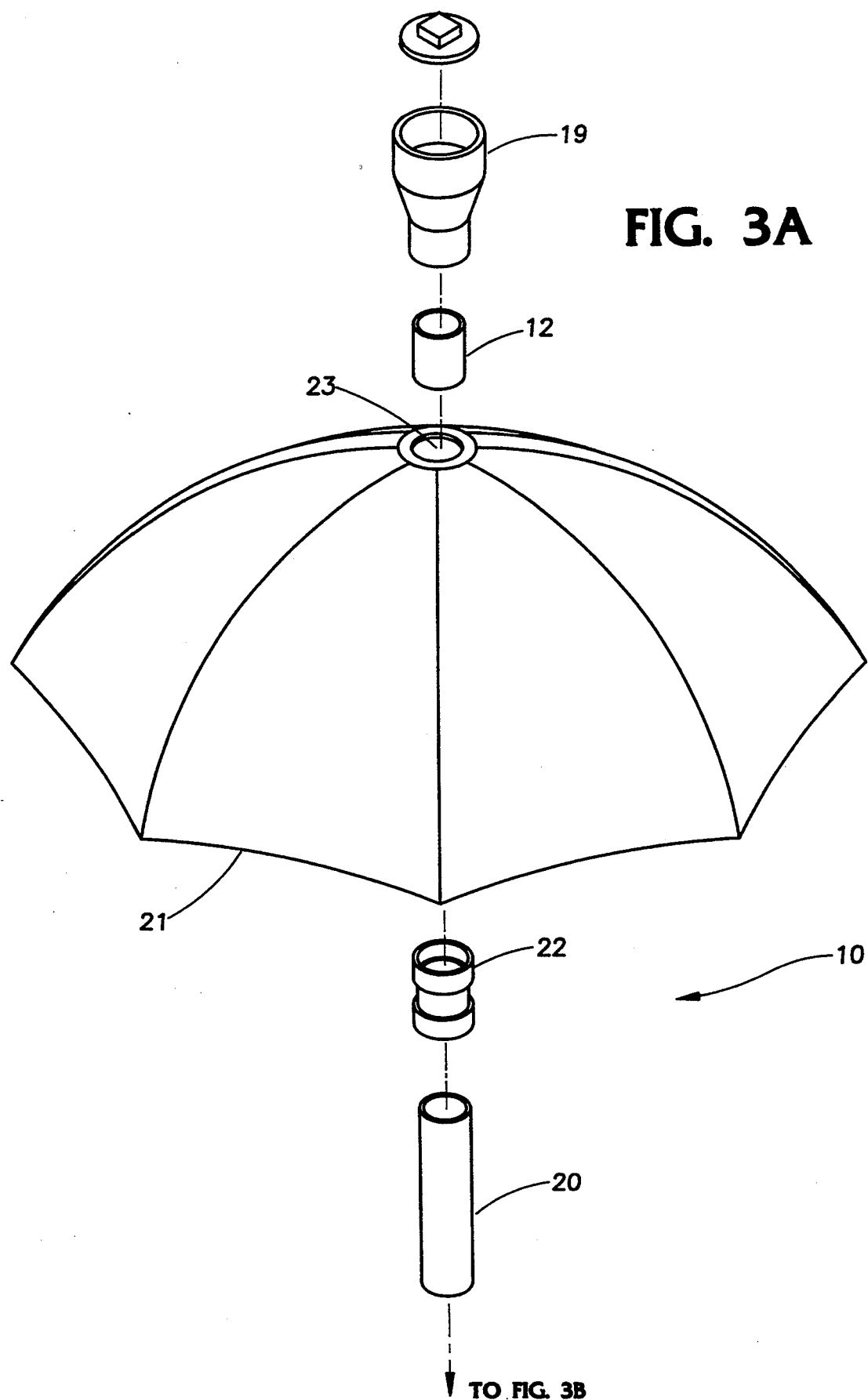

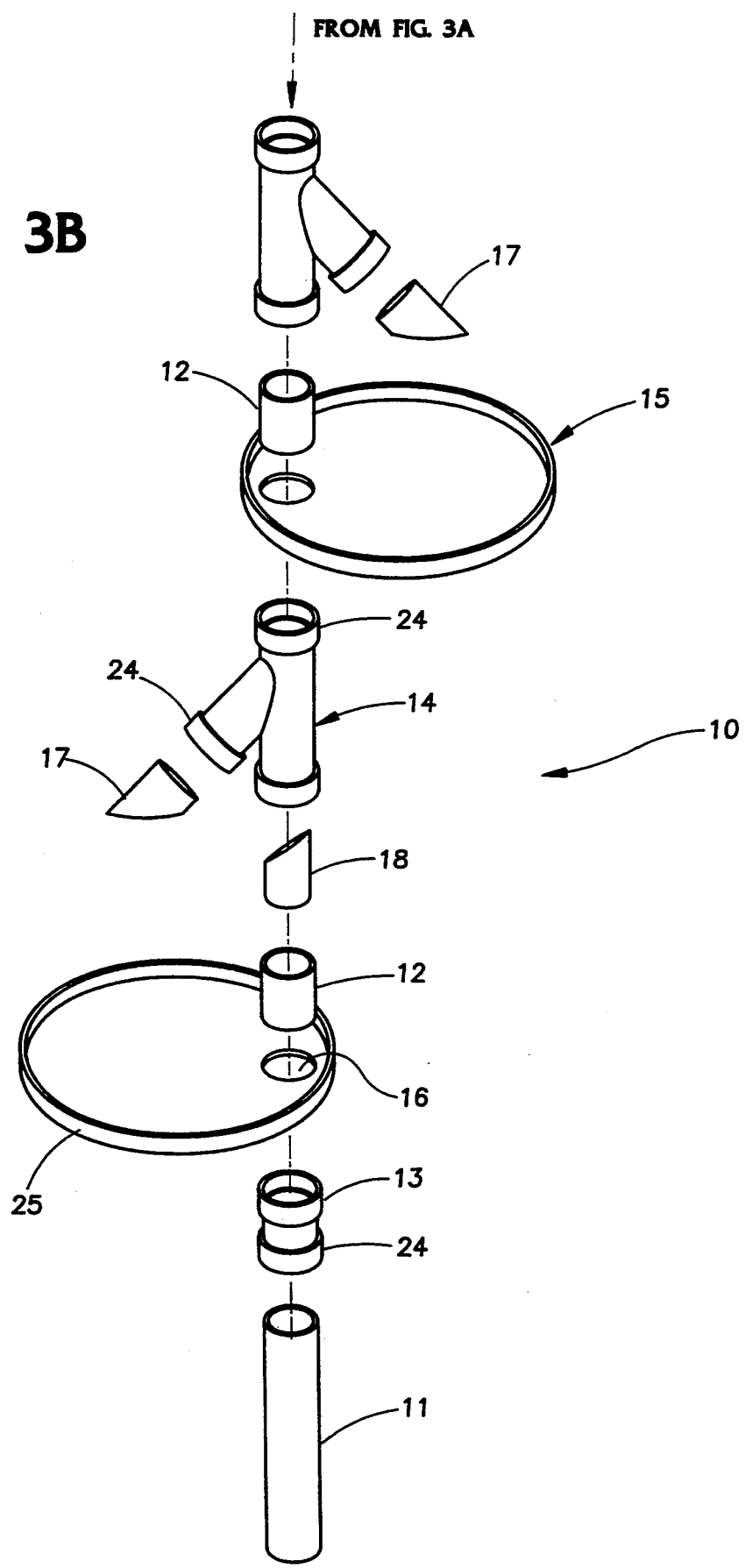

BIRD FEEDER FORMED OF A PLURALITY OF INTERCONNECTED TUBULAR COLUMNS

BACKGROUND OF THE INVENTION

1. Field of the Invention

This invention relates to, in general, to a bird feeder and, more particularly, to an apparatus that gravity dispenses bird food to each level upon which the bird feed.

2. Description of the Related Art

Although the related art bird feeders used in the past have performed their function of providing feed for birds and attracting them to a certain area, they are generally unsatisfactory in that they often have to be attached to another object such as a tree, fence or post that is not in a preferred location. Very often earlier bird feeders had to be constantly attended in order to keep an sufficient amount of feed available to the birds. Some feeders tried to solve this problem by providing an abundance of feed at one time. However, a large portion of this feed was often wasted by exposure to the weather or scattered by the birds or marauding rodents such as squirrels.

U.S. Pat. No. 5,022,349 to W. C. Bryant, et al., on Jun. 11, 1991 for a Bird Feeder Tree describes an artificial tree having seed in its trunk and feeding ports in the trunk providing access to the feed by the birds.

U.S. Pat. No. 5,044,319 to M. L. Blasbalg on Sep. 03, 1991 for a Bird Feeder has a tubular upper section and a tubular lower section. There is a valve assembly to selectively dispense seed from the upper section to the lower section.

U.S. Pat. No. 5,086,730 to R. S. Figley on Feb. 11, 1992 for a Bird Feeder describes a bird feeder having a straight tube filled with feed opening up to a single tray. The feeder has a hood to keep rodents away from the feed.

U.S. Pat. No. 5,235,935 to R. P. Edwards on Aug. 17, 1993 for a Bird Feeder has a center column for containing seed and an outer column forming a chamber for feed. The seed is distributed into the chamber by a slot through the center column and accessed by birds through narrow slot through an outer column. There are perches for the bird to grasp.

The present bird feeder may be located in a preferred area to maximize viewing of the birds while they feed and the feeder can be charged with feed which is automatically distributed to one or more feeding platforms.

SUMMARY OF THE INVENTION

This invention enables the user to feed numerous birds at the same time without the usual shuffling and scuffling among the birds as they vie with each other for room to eat. The multi-level platform feeding stations enable the user to determine the amount of bird food left in the feed distribution chamber columns by merely observing the platforms being utilized by the birds to feed. If one platform is not attracting birds then it is likely that the level of the feed has dropped below the feed distribution chamber column for that platform. The bird feeder is preferably made of PVC pipe and is modular. As more feeding platforms are needed, more may be added with a minimum of effort. The pieces of the bird feeder just press fit together and are easily assembled and disassembled. It is suggested that the support column be inserted into the ground to a depth of approximately eighteen inches to support a bird feeder of four or more feeding platforms. A feed abutment plug is usually placed in the lowest feed distribution chamber column. The feed abutment plug is designed to keep the bird feed from flowing into the support column and redirects the flow of the feed from the tubular feed distribution chamber columns onto the feeding platform just above it. The filler cap assembly has a filler funnel and a removable filler cap that may be threadingly connected to on press-fitted into the filler funnel (see FIGS. 2 and 3A). There is a removal lug on the removable filler cap to assist the user in removing the filler cap.

In one aspect of this invention, an apparatus for feeding birds is described that has a support column and a plurality of tubular male platform linking columns. A tubular support cross-over column connects the tubular support column to one of the male platform linking columns. There is a plurality of tubular feed distribution chamber columns. A plurality of feeding platforms have a link port. One of the tubular male linking columns, extending through the link port of one of the feeding platforms, removably connects the tubular support cross-over column to the tubular feed distribution chamber columns. Another one of the tubular male linking columns, extending through the link port of another one of the feeding platforms, removably connects one of the tubular feed distribution chamber columns to another one of the tubular feed distribution chamber columns. There is a filler cap assembly and a tubular filler cap assembly cross-over column that connects one of the tubular feed distribution chamber columns to the filler cap assembly.

In another aspect of this invention, an apparatus for feeding birds is described that has a tubular support column. There is also a plurality of tubular male platform linking columns. A tubular support cross-over column connects the tubular support column to one of the male platform linking columns. There is a plurality of tubular feed distribution chamber columns. There is a plurality of feeding platforms having a link port. One of the tubular male linking columns, extending through the link port of one of the feeding platforms, removably connects the tubular support cross-over column to the tubular feed distribution chamber columns. Another one of the tubular male linking columns, extending through the link port of another one of the feeding platforms, removably connects one of the tubular feed distribution chamber columns to another one of the tubular feed distribution chamber columns. A tubular feed direction column is connected to the tubular feed distribution chamber column. There is a feed abutment plug in one of the tubular feed distribution chamber columns. There is a filler cap assembly. A tubular filler cap assembly cross-over column connects one of the tubular feed distribution chamber columns to the filler cap assembly.

It is an object of this invention to provide a bird feeding apparatus that will distribute feed to one or more feeding platforms.

BRIEF DESCRIPTION OF THE DRAWINGS

FIG. 2 is a perspective view, without a protective canopy on the Bird Feeder, showing four feeding platforms thereon. The Bird Feeder could have more or less than four feeding platforms.

FIG. 3A and 3B are, when combined, a perspective exploded view of the Bird Feeder.

DESCRIPTION OF THE PREFERRED EMBODIMENT

Figure 1:
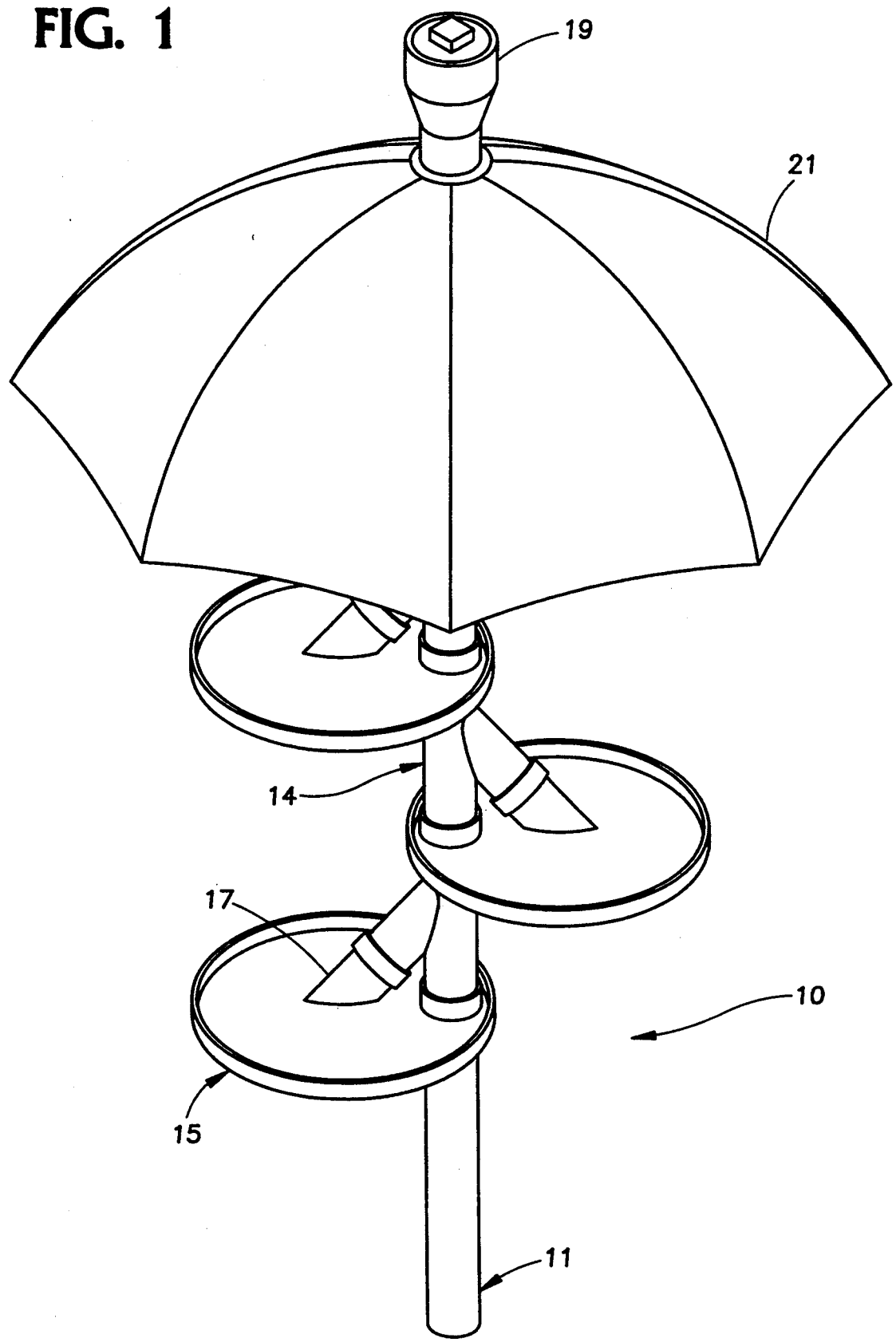
FIG. 1 is a perspective view of the Bird Feeder.
Figure 4:
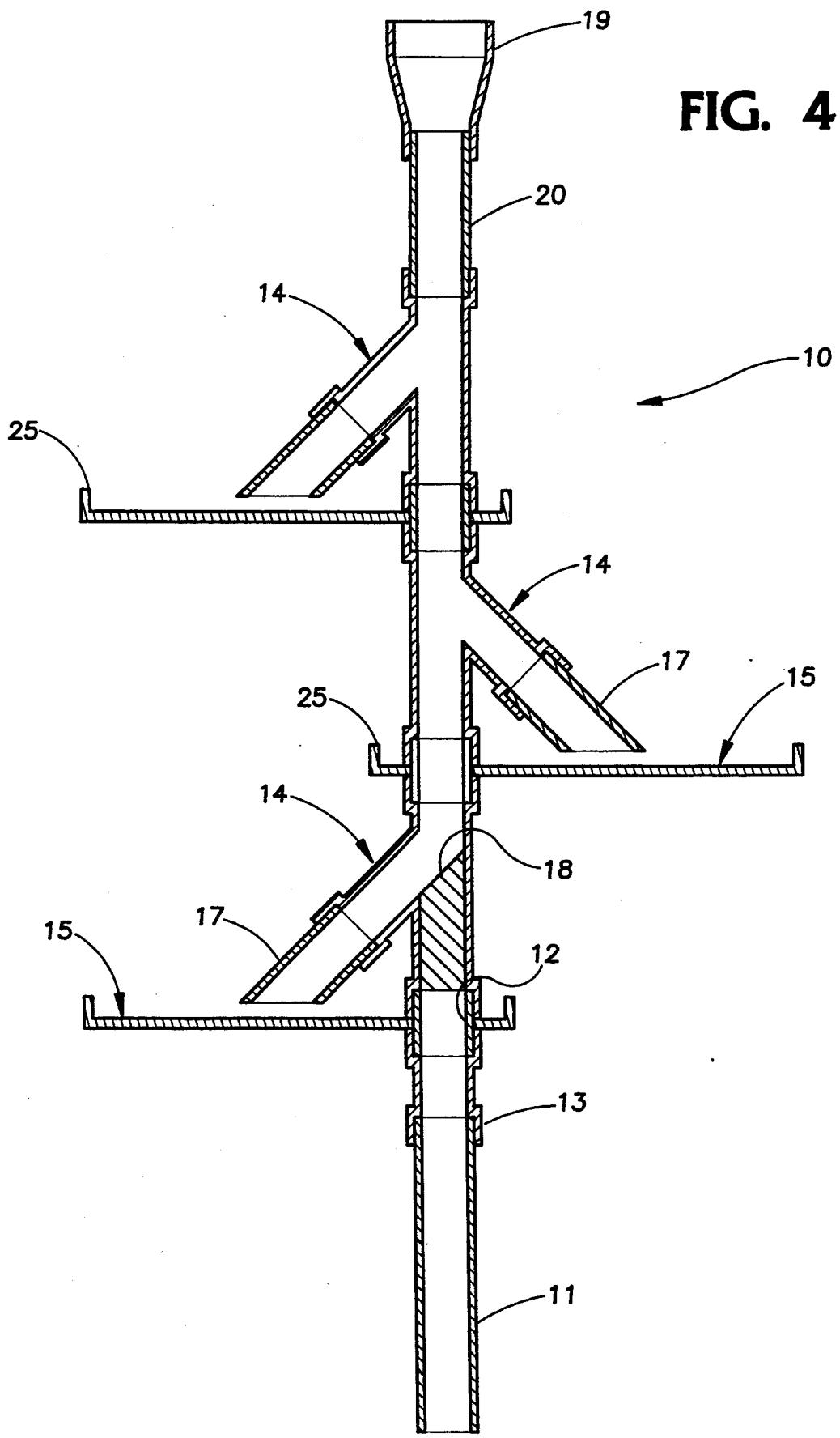
FIG. 4 is a cross-sectional view taken along lines 4—4 of FIG. 2.

Referring to FIGS. 1 through 4, an apparatus 10 for feeding birds is shown and described that has a tubular support column 11. There is a plurality of tubular male platform linking columns 12. A tubular support cross-over column 13 connects the tubular support column 11 to one of the tubular male platform linking columns 12. There is a plurality of tubular feed distribution chamber columns 14 and there is a plurality of feeding platforms 15 having a link port 16.

One of the tubular male linking columns 12, extending through the link port 16 of one of the feeding platforms 15, removably connects the tubular support cross-over column 13 to one of the tubular feed distribution chamber columns 14. Another one of the tubular male linking columns 12, extending through the link port 16 of another one of the feeding platforms 15, removably connects one of the tubular feed distribution chamber columns 14 to another one of the tubular feed distribution chamber columns 14.

There is a tubular feed direction column 17 connected to the tubular feed distribution chamber column 14. A feed abutment plug 18 is placed in one of the feed distribution chamber columns 14. There is a filler cap assembly 19. A tubular filler cap assembly cross-over column 20 connects one of the tubular feed distribution chamber columns 14 to the filler cap assembly 19. A canopy 21 is removably connected to one of the tubular feed distribution chamber columns 14. The tubular feed distribution chamber columns 14 and the tubular support cross-over columns 13 have a gripping ring 24 to assist in the assembly and disassembly of the bird feeder 10. There is a feed stop ring 25 on the outer circumferential edge of the feeding platform 15.

In order to make the proper connections (see FIGS. 3A and 3B), a canopy cross-over column 22 is removably connected to the tubular filler cap assembly cross-over column 20. Then, a tubular male linking column 12 is placed within the canopy port 23 of the canopy and then is removably connected to the canopy cross-over column 22. The filler cap assembly 19 is then removably connected to the tubular male linking column 12. The user may choose to utilize the bird feeder 10 without the canopy 21 as shown in FIG. 2.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for feeding birds comprising:
a vertical support column;
a tubular support cross-over column attached to an upper end of said support column;
a plurality of horizontally extending feeding platforms; each feeding platform including a link port;
a plurality of tubular male platform linking columns;
a plurality of tubular feed distribution chamber columns for distributing feed;
a filler cap assembly; and
a tubular filler cap assembly cross-over column;
each of said tubular male platform linking columns extending through the link port of one of said feeding platforms and connected to a lower end of one of said tubular feed distribution chamber columns such that feed may flow from each tubular feed distribution chamber column to the feeding platform associated therewith; said tubular feed distribution chamber columns being arranged in a vertically stacked array having a feed passageway therethrough; said tubular support cross-over column connected to the lowermost one of said tubular feed distribution chamber columns by the tubular male platform linking column connected to the lower end thereof; each tubular feed distribution chamber column connected to the adjacent lower tubular feed distribution chamber column by the tubular male linking column connected to the lower end thereof; the uppermost one of said tubular feed distribution chamber columns connected to the filler cap assembly by said tubular filler cap assembly cross-over column, said tubular filler cap assembly cross-over column forming a passageway connecting said filler cap assembly to said feed passageway through the vertically stacked array of tubular feed distribution chamber columns.

2. An apparatus for feeding birds comprising:
a vertical support column;
a tubular support cross-over column attached to an upper end of said support column;
a plurality of horizontally extending feeding platforms; each feeding platform including a link port;
a plurality of tubular male platform linking columns;
a plurality of tubular feed distribution chamber columns for distributing feed;
a tubular feed direction column connected to each tubular feed distribution chamber column;
a filler cap assembly; and
a tubular filler cap assembly cross-over column;
each of said tubular male platform linking columns extending through the link port of one of said feeding platforms and connected to a lower end of one of said tubular feed distribution chamber columns such that feed may flow from each tubular feed distribution chamber column through the tubular feed direction column to the feeding platform associated therewith;
said tubular feed distribution chamber columns being arranged in a vertically stacked array having a feed passageway therethrough, each tubular feed distribution chamber column connected to the adjacent lower tubular feed distribution column by the tubular male linking column connected to the lower end thereof; said tubular support cross-over column connected to the lowermost one of said tubular feed distribution chamber columns by the tubular male platform linking column connected to the lower end thereof; the lowermost tubular feed distribution chamber column having a feed abutment plug disposed therein closing off a lower end of said feed passageway through said vertical array of tubular feed distribution chamber columns; the uppermost one of said tubular feed distribution chamber columns connected to the filler cap assembly by said tubular filler cap assembly cross-over column, said tubular filler cap assembly cross-over column forming a passageway connecting said filler cap assembly to said feed passageway through the vertically stacked array of tubular feed distribution chamber columns.

3. An apparatus for feeding birds comprising:
a vertical support column;
a tubular support cross-over column attached to an upper end of said support column;
a plurality of horizontally extending feeding platforms; each feeding platform including a link port;
a plurality of tubular male platform linking columns;
a plurality of tubular feed distribution chamber columns for distributing feed;
a tubular feed direction column connected each tubular feed distribution chamber column;
a filler cap assembly;
a tubular filler cap assembly cross-over column; and
a canopy removably connected to one of said tubular feed distribution chamber columns;
each of said tubular male platform linking columns extending through the link port of one of said feeding platforms and connected to a lower end of one of said tubular feed distribution chamber columns such that feed may flow from each tubular feed distribution chamber column through the tubular feed direction column to the feeding platform associated therewith;
said tubular feed distribution chamber columns being arranged in a vertically stacked array having a feed passageway therethrough, each tubular feed distribution chamber column connected to the adjacent lower tubular feed distribution column by the tubular male linking column connected to the lower end thereof; said tubular support cross-over column connected to the lowermost one of said tubular feed distribution chamber columns by the tubular male platform linking column connected to the lower end thereof; the lowermost tubular feed distribution chamber column having a feed abutment plug disposed therein closing off a lower end of said feed passageway through said vertical array of tubular feed distribution chamber columns; the uppermost one of said tubular feed distribution chamber columns connected to the filler cap assembly by said tubular filler cap assembly cross-over column, said tubular filler cap assembly cross-over column forming a passageway connecting said filler cap assembly to said feed passageway through the vertically stacked array of tubular feed distribution chamber columns.

* * * * *